(12) United States Patent
Choi et al.

(10) Patent No.: US 9,048,915 B2
(45) Date of Patent: Jun. 2, 2015

(54) METHOD AND APPARATUS FOR SPLITTING RECEIVED SIGNAL

(71) Applicants: Samsung Electronics Co., Ltd, Gyeonggi-do (KR); Korea Advanced Institute of Science and Technology, Daejeon (KR)

(72) Inventors: Sanghyouk Choi, Chungcheongbuk-do (KR); Dongmin Park, Gyeonggi-do (KR); Heeseong Yang, Seoul (KR); Joohwan Chun, Daejeon (KR)

(73) Assignees: SAMSUNG ELECTRONICS CO., LTD, Suwon-Si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/077,044

(22) Filed: Nov. 11, 2013

(65) Prior Publication Data

US 2014/0133605 A1  May 15, 2014

(30) Foreign Application Priority Data

Nov. 9, 2012  (KR) ........................ 10-2012-0126663

(51) Int. Cl.
*H04L 27/06* (2006.01)
*H04B 7/08* (2006.01)
(Continued)

(52) U.S. Cl.
CPC .............. *H04B 7/084* (2013.01); *H04L 1/0045* (2013.01); *H04L 27/2647* (2013.01)

(58) Field of Classification Search
CPC ..... H04L 27/14; H04L 27/144; H04L 27/368; H04L 27/3854; H04L 27/389; H04L 1/0045; H03H 7/21; H03H 17/0283; H03D 7/165; H01P 1/18
USPC ................. 375/285, 316, 340, 346, 348–350; 455/132, 137, 139
See application file for complete search history.

(56) References Cited

U.S. PATENT DOCUMENTS 6,377,213 B1 * 4/2002 Odachi et al. ................. 342/383
7,714,781 B2 * 5/2010 Xia et al. ...................... 342/370
(Continued)

FOREIGN PATENT DOCUMENTS

| KR | 2000 0012971 A | 3/2000 |
| KR | 2009 0039946 A | 4/2009 |
| WO | WO 2012/098437 A1 | 7/2012 |

OTHER PUBLICATIONS

International Search Report dated Feb. 17, 2014 in connection with International Patent Application No. PCT/KR2013/010205, 3 pages.

*Primary Examiner* — Khanh C Tran

(57) ABSTRACT

A method and apparatus for splitting signals received via a plurality of antennas. A signal split apparatus of the present disclosure includes a first antenna which receives a first input signal, a second antenna which receives a second input signal, a first phase shifter which shifts phase by applying a first modulation frequency to the first input signal, a second phase shifter which shifts phase by applying a second modulation frequency to the second input signal, a summer which sums the phase-shifted first and second input signals, and an analog-digital converter which converts the summed signal to a digital signal, wherein the first and second modulation frequencies are different from each other. The signal split apparatus and method of the present disclosure is capable of splitting signals efficiently.

20 Claims, 5 Drawing Sheets

(51) Int. Cl.
*H04L 1/00* (2006.01)
*H04L 27/26* (2006.01)

(56) References Cited

U.S. PATENT DOCUMENTS

| | | | |
|---|---|---|---|
| 7,714,783 B2* | 5/2010 | Niu et al. ...................... 342/377 |
| 7,840,199 B2* | 11/2010 | Krishnaswamy et al. .... 455/147 |
| 7,898,478 B2* | 3/2011 | Niu et al. ...................... 342/377 |
| 8,089,394 B2* | 1/2012 | Stewart et al. ................ 342/104 |
| 2003/0162566 A1 | 8/2003 | Shapira et al. |
| 2009/0003480 A1* | 1/2009 | Chen et al. .................... 375/260 |
| 2009/0104884 A1 | 4/2009 | Lee et al. |
| 2010/0027968 A1 | 2/2010 | Bourdon et al. |
| 2013/0177116 A1* | 7/2013 | Wyville ........................ 375/349 |

* cited by examiner

METHOD AND APPARATUS FOR SPLITTING RECEIVED SIGNAL

CROSS-REFERENCE TO RELATED APPLICATION(S) AND CLAIM OF PRIORITY

The present application is related to and claims the benefit under 35 U.S.C. §119(a) of a Korean patent application No. 10-2012-0126663 filed on Nov. 9, 2012 in the Korean Intellectual Property, the entire disclosure of which is hereby incorporated by reference.

TECHNICAL FIELD

The present disclosure relates to a radio signal processing method and apparatus and, in particular, to a method and apparatus for splitting signals received via a plurality of antennas.

BACKGROUND

With the rapid development of wireless communication technology, user requirements have grown. In order to meet the growing user requirements on the large volume and high quality data communication, multi-antenna technology using two or more antennas is adopted.

In the case of using two or more antennas (antenna elements), i.e. an antenna array, if the antennas are connected to respective Analog to Digital (A/D) converters, there is no problem of splitting the signals received via the antennas. However, since the A/D converter or a device responsible for the similar function is expensive part, it is advantageous to reduce the number of A/D converters used for processing signal as far as possible from the view point of cost effectiveness. Furthermore, reducing the number of A/D convertors is also advantageous in reducing the power consumption and heat and conserving space for internal components.

In the convention technology in which a plurality antenna and other signaling components are connected to one digital path, i.e. one A/D converter, the same signal is received several times. In this case, the intended signals are split by applying different post-processing algorithms to the same signal received repeatedly.

FIG. 1 illustrates the signal split algorithm.

Referring to FIG. 1, the signal reception apparatus includes a first antenna 101, a second antenna 102, a first phase shifter 103, a second phase shifter 104, a summer 105, and an A/D converter 106. The first antenna 101 is connected to the first phase shifter 103, and the second antenna 102 is connected to the second phase shifter 104.

It is assumed that the first antenna 101 receives signal $x_1$ and the second antenna 102 receives signal $x_2$. The signal reception apparatus receive the same signal twice. The signal reception apparatus applies phase values of orthogonal unitary code to the phase shifters 103 and 104 in receiving the signals.

The first phase shifter 103 multiplies the phase $w_1$ to the signal received via the first antenna 101 in receiving the signal $x_1$, and the second phase shifter 104 multiplies the phase $w_2$ to the signal received via second antenna 102 in receiving the signal $x_2$ first. The phase-shifted signals are summed at the summer 105 and the summed signal is converted to the digital signal by the A/D converter 106. The result signal is expressed as $y_1 = x_1 w_1 + x_2 w_2$.

Equation (1) shows the relationship between the aforementioned signals and phases.

$$\begin{bmatrix} w_1 & w_2 \\ v_1 & v_2 \end{bmatrix} \begin{bmatrix} x_1 \\ x_2 \end{bmatrix} = \begin{bmatrix} y_1 \\ y_2 \end{bmatrix} \quad (1)$$

Equation (1) can be modified into equation (2).

$$\begin{bmatrix} x_1 \\ x_2 \end{bmatrix} = \begin{bmatrix} w_1 & w_2 \\ v_1 & v_2 \end{bmatrix}^H \begin{bmatrix} y_1 \\ y_2 \end{bmatrix} \quad (2)$$

Using equation (2), it is possible to split the signals $x_1$ and $x_2$ received via the two antennas 101 and 102 using the output signals $y_1$ and $y_2$ and the phase shift values $w_1$, $w_2$, $v_1$, and $v_2$.

However, the conventional method has a drawback in that the same signal has to be received twice or more times. Also, the conventional method has a drawback in that the repetitive reception of the same signal delays splitting the signal.

SUMMARY

To address the above-discussed deficiencies, it is a primary object to provide a signal split apparatus and method that is capable of splitting the signal efficiently.

In accordance with an aspect of the present disclosure, a signal split apparatus includes a first antenna which receives a first input signal, a second antenna which receives a second input signal, a first phase shifter which shifts phase by applying a first modulation frequency to the first input signal, a second phase shifter which shifts phase by applying a second modulation frequency to the second input signal, a summer which sums the phase-shifted first and second input signals, and an analog-digital converter which converts the summed signal to a digital signal, wherein the first and second modulation frequencies are different from each other.

In accordance with another aspect of the present disclosure, a signal split method includes receiving a first input signal and a second input signal, shifting a phase of the first input signal by applying a first modulation frequency, shifting a phase of the second input signal by applying a second modulation frequency, summing the phase-shifted first and seconded input signals, and converting the summed signal to a digital signal, wherein the first and second modulation frequencies have different values.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
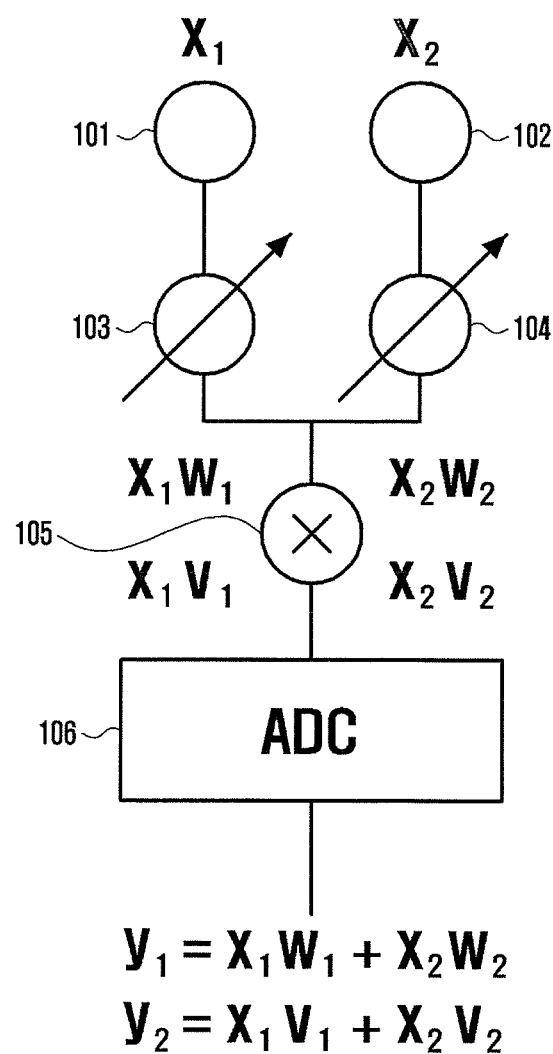
FIG. 1 illustrates the signal split algorithm.

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Advantages and features of the present disclosure and methods of accomplishing the same may be understood more readily by reference to the following detailed description of example embodiments and the accompanying drawings. The present disclosure may, however, be embodied in many different forms and should not be construed as being limited to the example embodiments set forth herein. Rather, these example embodiments are provided such that this disclosure will be thorough and complete and will fully convey the concept of the disclosure to those skilled in the art, and the present disclosure may be defined by the appended claims. Like reference numerals refer to like elements throughout the specification.

The signal split apparatuses and methods according to embodiments of the present disclosure are described with reference to accompanying drawings.

In the present disclosure, the term 'antenna' denotes an antenna element of an antenna array.

Figure 2:
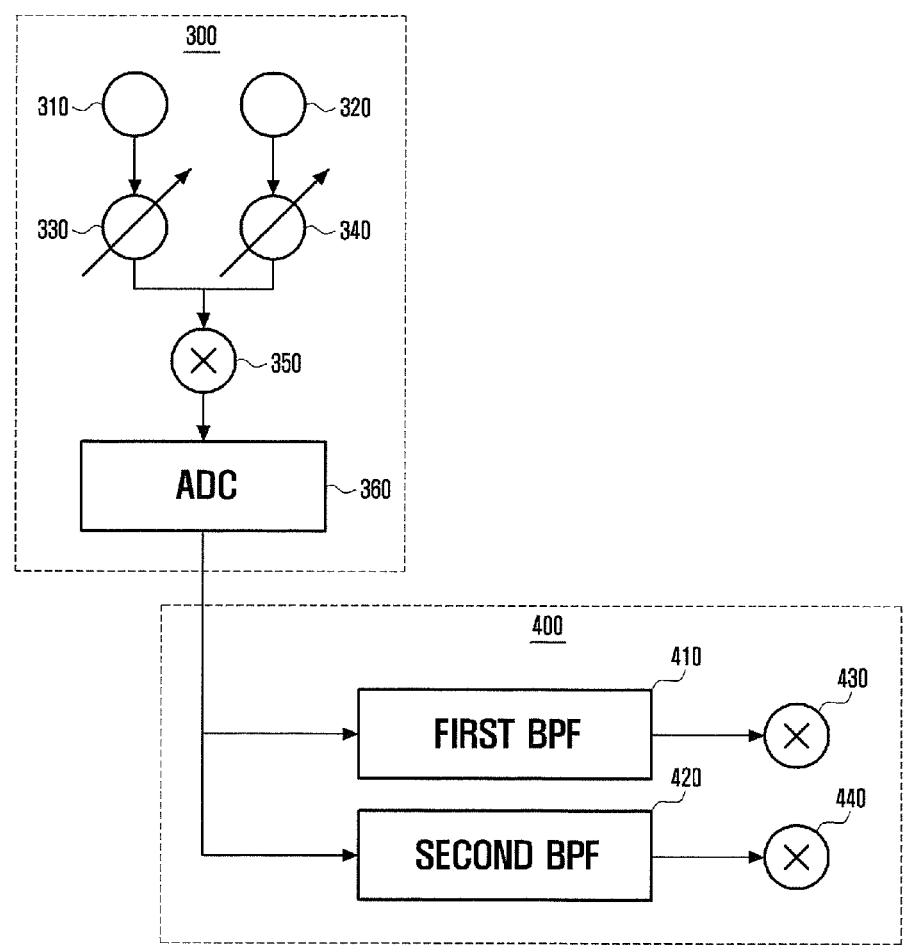
FIG. 2 illustrates a block diagram of a signal split apparatus according to an embodiment of the present disclosure.

FIG. 2 illustrates a block diagram of a signal split apparatus according to an embodiment of the present disclosure.

Referring to FIG. 2, the signal split apparatus according to an embodiment of the present disclosure includes a first antenna 310, a second antenna 320, a first phase shifter 330, a second phase shifter 340, a summer 350, an Analog to Digital (A/D) converter 360, a first band pass filter 410, a second band pass filter 420, a first frequency demodulator 430, a second frequency demodulator 440.

The signal split apparatus may be parted into an analog processor 300 including the first antenna 310, the second antenna 320, the first phase shifter 330, the second phase shifter 340, the summer 350, and the A/D converter 360; and a digital processor 400 including the first band pass filter 420, the second band pass filter 430, the first frequency demodulator 430, and the second frequency demodulator 440. Although the signal split apparatus is parted into two parts for explanation convenience, at least one of the components of can be changed in position.

Figure 3:
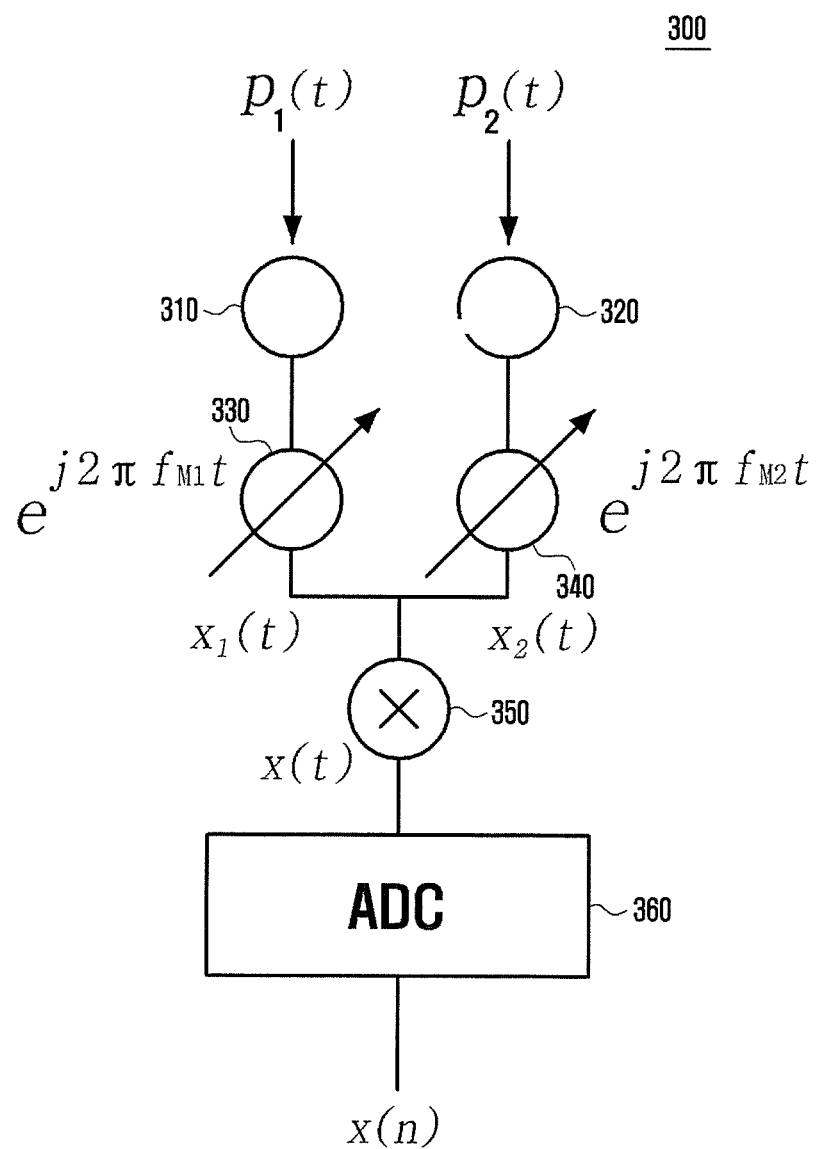
FIG. 3 illustrates a diagram of the operation of the analog processor of FIG. 2.

FIG. 3 illustrates a diagram of the operation of the analog processor of FIG. 2.

Referring to FIG. 3, the first antenna 310 receives the signal $p_1(t)$, which is transferred to the first phase shifter 330. The second antenna 320 receives the signal $p_2(t)$, which is transferred to the second phase shifter 340. The first phase shifter 330 applies the phase shift value $e^{j2\pi f_{M1}t}$ to the signal $P_1(t)$ to output the signal $x_1(t)$. Likewise, the second phase shifter 340 applies the phase shift value $e^{j2\pi f_{M2}t}$ to the signal $p_2(t)$ to output the signal $x_2(t)$. Herein, $f_{M1}$ and $f_{M2}$ denote modulation frequencies, t denotes time. That is, as time goes by the phase shift value to be applied to the signal varies. $f_{M1}$ and $f_{M2}$ are set to different values so as to make it possible to distinguish the two input values $p_1(t)$ and $p_2(t)$ from each other. $f_{M1}$ and $f_{M2}$ also can be set to the values capable of avoiding aliasing and frequency band overlap. That is, the phase shifters 330 and 340 perform switching between different frequencies and apply phase shift to the input signals. The phase-shifted signals $x_1(t)$ and $x_2(t)$ are transferred to the summer 350. The phase shift value varies in a subframe of a unit time duration for receiving the signal.

The phase shifters 330 and 340 can be implemented in one of Loaded Line type, Hybrid Coupled Type, and other currently unknown but to be known in the future.

The summer 350 outputs the signal x(t) output as a result of summation of the phase shifted signals $x_1(t)$ and $x_2(t)$. The A/D converter 360 converts the signal x(t) to the digital x(n). Since the implementations of the summer 350 and the A/D converter 360 are output of the scope of the present disclosure, detailed descriptions thereon are omitted herein.

Figure 4:
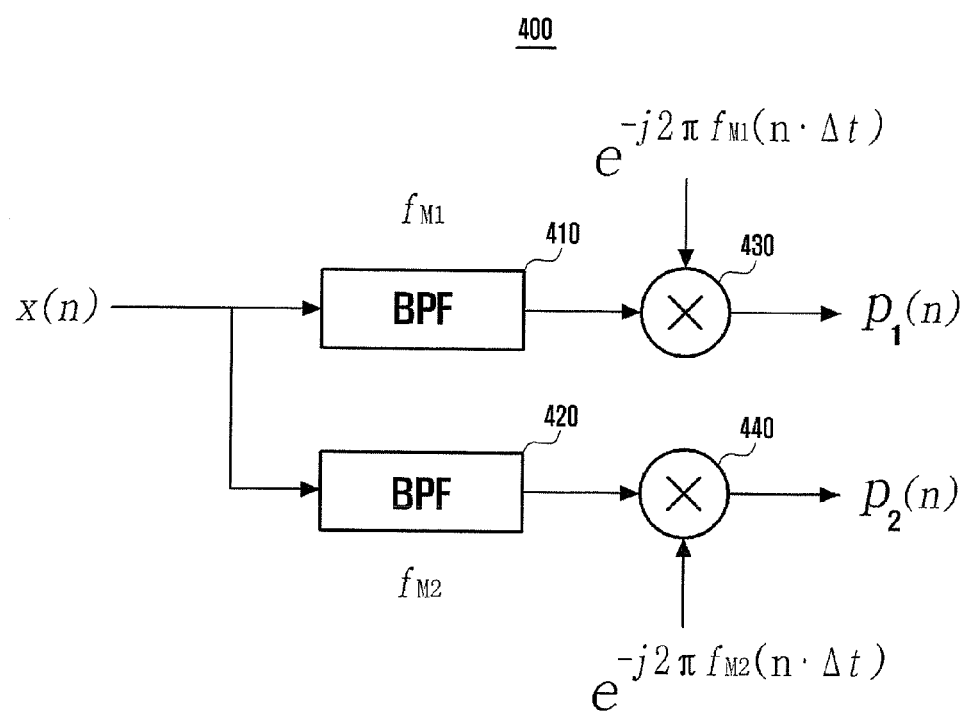
FIG. 4 illustrates a diagram of the operation of the digital processor of FIG. 2.

FIG. 4 illustrates a diagram of the operation of the digital processor of FIG. 2.

Referring to FIG. 4, the digital signal x(n) output by the A/D converter 360 is transferred to the first band pass filter 410 and the second band pass filter 420. The first and second band pass filters 410 and 420 perform filtering on the signal. That is, the first band pass filter 410 performs filtering the modified frequency $f_{M1}$ applied in phase shifting of the first phase shifter 330 as the center frequency and is the band pass filter that includes a predetermined cutoff area. The second band pass filter 420 performs filtering the modified frequency $f_{M2}$ applied in phase shifting of the second phase shifter 340 as the center frequency and is the band pass filter that includes a predetermined cutoff area. Herein, the cutoff areas of the two band pass filters 410 and 420 are determined the size of the frequency band of the transmitter which includes transmitted the signal to the signal split apparatus. Since the signal split apparatus knows the size of the frequency band used by the transmitter, this can be a preset value. For example, the cutoff areas applied to the two band pass filters 410 and 420 can be identical with the frequency band of the transmitter in size. Since the implementation of band pass filter is out of the scope of the present disclosure, detailed description thereon is omitted herein. The above described band pass filter is an example filter for filtering signal and can be substituted by similar filters capable of filtering out unnecessary signals with the exception of specific modulated frequency signal.

The signal passed the first band pass filter 410 is transferred to the first frequency demodulator 430. The signal passed the second band pass filter 420 is transferred to the second frequency demodulator 440. The first and second frequency demodulators 430 and 440 recover the respective signals.

The first frequency demodulator 430 can use $e^{-j2\pi f_{M1}(n \cdot \Delta t)}$ for demodulation. Likewise, the second frequency demodulator 440 can use $e^{-j2\pi f_{M2}(n \cdot \Delta t)}$ for demodulation. Herein, $\Delta t$ can be the increment value of time while the antenna receives the signal once. The first frequency demodulator 430 is configured to demodulate the signal modulated with modulation frequency $f_{M1}$. Likewise, the second frequency demodulator 440 is configured to demodulate the signal modulated with the modulation frequency $f_{M2}$. As a consequence, the first frequency demodulator 430 outputs the demodulated signal $p_1(n)$. Likewise, the second frequency demodulator 440 outputs the demodulated signal $p_2(n)$. The demodulated signal $p_1(n)$ corresponds to the input signal $p_1(t)$, and the demodulated signal $p_2(n)$ corresponds to the input signal $p_2(t)$. Since the implementation of the demodulator is out of the scope of the present disclosure, detailed description thereon is omitted herein.

The above-described embodiment is directed to the case where two antennas are connected to on A/D converter. However, the present disclosure is applicable to the case where three or more antennas are connected to one A/D converter.

Figure 5:
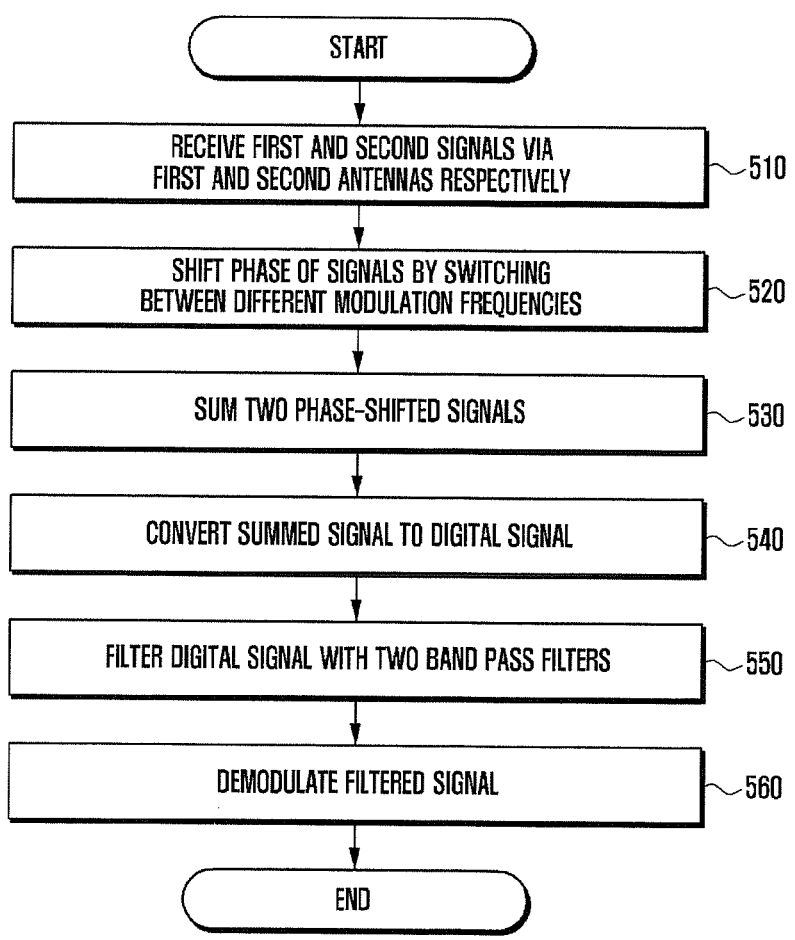
FIG. 5 illustrates a process of the signal split method according to an embodiment of the present disclosure.

FIG. 5 illustrates a process of the signal split method according to an embodiment of the present disclosure.

Referring to FIG. 5, the first and second antennas 310 and 320 receive the first and second signals, respectively, at block 510. The first phase shifter 330 shifts the phase of the first signal and the second phase shifter 340 shifts the phase of the second signal at block 520. Referring to FIG. 3, the two phase shifters 330 and 340 change the phase shift values depending on the specific modulation frequency in a subframe while perform phase shift. The modulation frequency of the first phase shifter 330 and the modulation frequency of the second phase shifter 340 have different values and configured so as to avoid antialiasing to each other.

The summer 350 sums the phase-shifted signals at block 530. The A/D converter 360 converts the summed analog signals to digital signal at block 540.

The first and second band pass filters 410 and 420 filter the digital signals at block 550. In an example embodiment, the two band pass filters 410 and 420 perform filtering to acquire the signal of the adjacent band including the modulation frequency of the first phase shifter 330 and the modulation frequency of the second phase shifter.

The first and second demodulators 430 and 440 demodulate the signals passed the band pass filters 410 and 420 at block 560. In an example embodiment, the modulation frequency of the first phase shifter 330 and the modulation frequency of the second phase shifter 340 are used for the modulators 430 and 440 respectively.

Through the above-described procedure, the signal split apparatus is capable of splitting the signals received via the respective antennas 310 and 320 at a time. In one example embodiment, where one A/D converter 360 is used, it is possible to split the signals received at a time using other components, for example, the phase shifters 330 and 340, for changing the phase shift values as time goes by and filtering/modulating the signals. The signal split apparatus and method of the present disclosure is capable of splitting the signals received via respective antennas of an antenna array that includes a sub-array structure at a time. That is, the signal split apparatus and method of the present disclosure is capable of reducing antenna implementation cost using the sub-array structure antenna and equalizing the degree of freedom of the adaptive processing performed at the digital processing part to that of the fully digital array antenna.

The signal split method and apparatus of the present disclosure is applicable to Base Station-to-Mobile station (BS-to-MS) and MS-to-BS channel estimations in the Beam Division Multiple Access (BDMA) system. In an example embodiment, there may not be a need to transmit the reference signal for channel estimations of plural antennas in sub-array structure; it is possible to conserve resource consumption.

It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions also can be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions also can be loaded onto a computer or other programmable data processing apparatus to cause a series of operational blocks to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams can illustrate parts of modules, segments or codes including at least one or more executable instructions for performing specific logic function(s). Moreover, it should be noted that the functions of the blocks can be performed in different order in several modifications. For example, two successive blocks can be performed substantially at the same time, or can be performed in reverse order according to their functions.

The term "module" according to the embodiments of the disclosure, means, but is not limited to, a software or hardware component, such as a Field Programmable Gate Array (FPGA) or Application Specific Integrated Circuit (ASIC), which performs certain tasks. A module advantageously can be configured to reside on the addressable storage medium and configured to be executed on one or more processors. Thus, a module can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality in the components and modules can be combined into fewer components and modules or further separated into additional components and modules. In addition, the components and modules can be implemented such that they execute one or more CPUs in a device or a secure multimedia card.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

Although the present disclosure has been described with an example embodiment, various changes and modifications may be suggested to one skilled in the art. It is intended that the present disclosure encompass such changes and modifications as fall within the scope of the appended claims.

What is claimed is:

1. A signal split apparatus comprising:
a first antenna configured to receive a first input signal;
a second antenna configured to receive a second input signal;
a first phase shifter configured to shift a phase by applying a first modulation frequency to the first input signal;
a second phase shifter configured to shift a phase by applying a second modulation frequency to the second input signal;
a summer configured to sum the phase-shifted first and second input signals to form a summed signal; and
an analog-digital converter configured to convert the summed signal to a digital signal,
wherein the first and second modulation frequencies are different from each other.

2. The signal split apparatus of claim 1, further comprising:
a first filter configured to filter the digital signal using the first modulation frequency;
a second filter configured to filter the digital signal using the second modulation frequency;
a first frequency demodulator configured to demodulate the signal filtered with the first modulation frequency to output a first output signal; and
a second frequency demodulator configured to demodulate the signal filtered with the second modulation frequency to output a second output signal.

3. The signal split apparatus of claim 2, wherein the first and second modulation frequencies are configured to avoid antialiasing to each other and overlapping between a frequency band comprising the first modulation frequency as a center frequency and another frequency band comprising the second modulation frequency as a center frequency.

4. The signal split apparatus of claim 2, wherein the first filter filters the signal of bandwidth comprising a predetermined size with the first modulation frequency as a center frequency.

5. The signal split apparatus of claim 2, wherein the first phase shifter shifts the first input signal with a phase shift value of $e^{j2\pi f_{M1}t}$, and the second phase shifter shifts the second input signal with a phase shift value of $e^{j2\pi f_{M2}t}$, wherein $f_{M1}$ is the first modulation frequency and $f_{M2}$ is the second modulation frequency.

6. The signal split apparatus of claim 5, wherein the first frequency demodulator demodulates a signal using $e^{-j2\pi f_{M1}(n\cdot\Delta t)}$, and the second frequency demodulator demodulates a signal using $e^{-j2\pi f_{M2}(n\cdot\Delta t)}$, wherein n is a coefficient and $\Delta t$ an increment value of time while an antenna receives a signal.

7. The signal split apparatus of claim 2, wherein the first and second phase shifters switch phase shift values in a subframe.

8. A signal split method comprising:
receiving a first input signal and a second input signal;
shifting a phase of the first input signal by applying a first modulation frequency;
shifting a phase of the second input signal by applying a second modulation frequency;
summing the phase-shifted first and second input signals to form a summed signal; and
converting the summed signal to a digital signal,
wherein the first and second modulation frequencies are different from each other.

9. The signal split method of claim 8, further comprising:
filtering the digital signal using the first modulation frequency;
filtering the digital signal using the second modulation frequency;
demodulating the signal filtered with the first modulation frequency to output a first output signal; and
demodulating the signal filtered with the second modulation frequency to output a second output signal.

10. The signal split method of claim 9, wherein the first and second modulation frequencies are configured to avoid antialiasing to each other and overlapping between a frequency band comprising the first modulation frequency as center frequency and another frequency band comprising the second modulation frequency as center frequency.

11. The signal split method of claim 9, wherein the filtering of the digital signal using the first modulation frequency comprises filtering the signal of bandwidth comprising a predetermined size with the first modulation frequency as a center frequency.

12. The signal split method of claim 9, wherein the shifting of the phase of the first input signal comprises shifting the first input signal with a phase shift value of $e^{j2\pi f_{M1}t}$, and the shifting of the phase of the second input signal comprises shifting the second input signal with a phase shift value of $e^{j2\pi f_{M2}t}$, where $f_{M1}$ is the first modulation frequency and $f_{M2}$ is the second modulation frequency.

13. The signal split method of claim 12, wherein the demodulating of the signal filtered with the first modulation frequency comprises demodulating the signal using $e^{-j2\pi f_{M1}(N\cdot\Delta t)}$, and demodulating the signal filtered with the second modulation frequency comprises demodulating the signal using $e^{-j2\pi f_{M2}(n\cdot\Delta t)}$, wherein n is a coefficient and $\Delta t$ an increment value of time while an antenna receives a signal.

14. The method of claim 9, wherein the shifting of the phase of a first input signal comprises switching the phase shift value in a subframe.

15. A mobile device comprising:
a controller; and
a transceiver associated with the controller, wherein the transceiver is configured to:
receive a first input signal and a second input signal;
shift a phase of the first input signal by applying a first modulation frequency;
shift a phase of the second input signal by applying a second modulation frequency;
sum the phase-shifted first and second input signals to form a summed signal; and
convert the summed signal to a digital signal,
wherein the first and second modulation frequencies are different from each other.

16. The mobile device of claim 15, wherein the transceiver is further configured to:
filter the digital signal using the first modulation frequency;
filter the digital signal using the second modulation frequency;
demodulate the signal filtered with the first modulation frequency to output a first output signal; and
demodulate the signal filtered with the second modulation frequency to output a second output signal.

17. The mobile device of claim 16, wherein the first and second modulation frequencies are configured to avoid antialiasing to each other and overlapping between a frequency band comprising the first modulation frequency as center frequency and another frequency band comprising the second modulation frequency as center frequency.

18. The mobile device of claim 16, wherein the filtering of the digital signal using the first modulation frequency comprises filtering the signal of bandwidth comprising a predetermined size with the first modulation frequency as a center frequency.

19. The mobile device of claim 16, wherein the shifting of the phase of the first input signal comprises shifting the first input signal with a phase shift value of $e^{j2\pi f_{M1}t}$, and the shifting of the phase of the second input signal comprises shifting the second input signal with a phase shift value of $e^{j2\pi f_{M2}t}$, wherein $f_{M1}$ is the first modulation frequency and $f_{M2}$ is the second modulation frequency.

20. The mobile device of claim 19, wherein the demodulating of the signal filtered with the first modulation frequency comprises demodulating the signal using $e^{-j2\pi f_{M1}(n\cdot\Delta t)}$, and demodulating the signal filtered with the second modulation frequency comprises demodulating the signal using $e^{-j2\pi f_{M2}(n\cdot\Delta t)}$, wherein n is a coefficient and $\Delta t$ an increment value of time while an antenna receives a signal.

* * * * *